(12) United States Patent
Jin et al.

(10) Patent No.: US 7,543,012 B2
(45) Date of Patent: Jun. 2, 2009

(54) METHOD AND APPARATUS TO PERFORM SQUARING OPERATION IN FINITE FIELD

(75) Inventors: Weon-il Jin, Suwon-si (KR); Mi-suk Huh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 955 days.

(21) Appl. No.: 10/868,186

(22) Filed: Jun. 16, 2004

(65) Prior Publication Data

US 2005/0021584 A1 Jan. 27, 2005

(30) Foreign Application Priority Data

Jun. 16, 2003 (KR) .................. 10-2003-0038684
Nov. 3, 2003 (KR) .................. 10-2003-0077329

(51) Int. Cl.
*G06F 7/00* (2006.01)

(52) U.S. Cl. ........................... 708/492; 708/490

(58) Field of Classification Search .................. 708/492, 708/490
See application file for complete search history.

(56) References Cited

U.S. PATENT DOCUMENTS

| | | | | |
|---|---|---|---|---|
| 4,587,627 | A * | 5/1986 | Omura et al. ............... | 708/492 |
| 5,046,037 | A * | 9/1991 | Cognault et al. ............ | 708/492 |
| 5,689,452 | A * | 11/1997 | Cameron .................... | 708/492 |
| 6,038,581 | A | 3/2000 | Aoki et al. | |
| 6,202,076 | B1 | 3/2001 | Aoki et al. | |
| 6,266,688 | B1 | 7/2001 | Aoki et al. | |
| 2004/0236812 | A1* | 11/2004 | Stein et al. .................. | 708/492 |

FOREIGN PATENT DOCUMENTS

EP         1076284         2/2001

OTHER PUBLICATIONS

Huapeng, Bit-parallel Finite Field Multiplier and Squarer Using Polynomial Basis, IEEE Transactions on computers, vol. 51, No. 7, Jul. 2002, pp. 750-758.*

(Continued)

*Primary Examiner*—Lewis A Bullock, Jr.
*Assistant Examiner*—Michael Yaary
(74) *Attorney, Agent, or Firm*—Staas & Halsey LLP

(57) ABSTRACT

A method and apparatus to square an element A when a defining polynomial of a finite field $GF(2^n)$ is expressed as $$f(x) = x^n + \sum_{i=1}^{t} x^{k_i} + 1,$$

and the element A contained in the finite field is expressed as $A=(a_0, a_1, a_2, \ldots, a_{n-1}) \in GF(2^n)$. The method determines coefficients $m_i$, $I_{ij}$, $V_0$, $V_{ij}$, and V such that the coefficient $m_i$ satisfies a predetermined condition with respect to $k_i$ when $1 \leq i \leq t$ is a natural number, $I_{ij}$ depends on n, $k_i$, and j when $2 \leq j \leq m_i$, $V_0$ and $V_{ij}$ of n bits, respectively, depend on n, $I_{ij}$, and $k_i$, and obtains the coefficient V with respect to $m_i$ according to the following formula $$V_i = V_{i2} \oplus V_{i3} \oplus \ldots \oplus V_{im_i}$$

$$V = V_0 \oplus \sum_{m_i \neq 0} V_i$$

determines a coefficient $s_i$ according to $k_i$ and n and cyclically shifts the coefficient V by $s_i$; performing an XOR operation on the cyclically shifted coefficient V and the element A; and rewires a result of the XOR operation in a predetermined order and outputs results of the squaring.

29 Claims, 7 Drawing Sheets

OTHER PUBLICATIONS

Bit-Parallel Finite Field Multiplier and Squarer Using Polynomial Basis, Huapeng Wu, *IEEE Transactions on Computers*, vol. 51, No. 7, Jul. 2002.

A New Hardware Architecture for Operations in GF ($2^n$), Chang Han Kim, Sangho Oh, and Jongin Lim, *IEEE Transactions on Computers*, vol. 51, No. 1, Jan. 2002.

VLSI Architectures for Computing Multiplications and Inverses in GF ($2^m$), Wang, Truong, Shao, Deutsch, Omura and Reed, *IEEE Transactions on Computers*, vol. C-34, No. 8, Aug. 1985.

Squaring architecture for GF($2^m$) and its applications in cryptographic systems, G. Orlando and C. Paar, *Electronics Letters*, Jun. 22, 2000, vol. 36, No. 13.

* cited by examiner

FIG. 7

| CONVENTIONAL ART | DIMENSION | BASIS | DEFINING POLYNOMIAL | AREA COMPLEXITY | TIME COMPLEXITY |
|---|---|---|---|---|---|
| H.Wu | ARBITRARY | STANDARD | $X^n+X^k+1$ ($1 \le k \le n/2$) | $n/4 \sim (n+k-1)/2$ XORs | 1 OR 2 XOR GATE DELAYS |
| C.H.KIM ET AL. | n+1:DECIMAL 2:PRIMITIVE ELEMENT OF GF(n+1) | ANOMALOUS | AOP | REWIRING | 0 GATE DELAY |
| K.AOKI ET AL. | n=2M:EVEN | PARTIAL FINITE FIELD OPERATION (GF($2^m$)<GF($2^n$)) | | SQUARING:2, MULTIPLICATION:1, ADDITION:1 IN GF($2^m$) | SQUARING:1, MULTIPLICATION:1, ADDITION:1 IN GF($2^m$) |
| LAMBERT ET AL. | ARBITRARY | CYCLIC | ARBITRARY | REWIRING | 0 GATE DELAY |
| G.ORLANDO ET AL. | ARBITRARY | STANDARD | ARBITRARY | 3.5n GATES+ MULTIPLIER | 4 GATE DELAYS+ MULTIPLICATION |
| C.C.WANG ET AL. | ARBITRARY | NORMAL | ARBITRARY | REWIRING | 0 GATE DELAY |
| PRESENT INVENTION | n:ODD | STANDARD | ARBITRARY | (n−1)/2+(k−1)/2 or (n−1)/2+k/2 XORs | 1 OR 2 XOR GATE DELAYS |
| | n:EVEN | STANDARD | ARBITRARY | (n+k−1)/2 XORs | 1 OR 2 XOR GATE DELAYS |

FIG. 8

| FINITE FIELD / CONVENTIONAL ART | SECT163K1, SECT163R1 | | SECT233K1, SECT233R1 | | SECT283K1, SECT283R1 | | OTHER |
|---|---|---|---|---|---|---|---|
| | AREA | TIME | AREA | TIME | AREA | TIME | |
| H. Wu | | | 153 XORs | 1 XOR GATE DELAY | | | INAPPLICABLE TO 163, 283 |
| C. H. Kim et.al | | | | | | | INAPPLICABLE |
| K. Aoki et. al | | | | | | | INAPPLICABLE |
| Lambert et. al | 26k GATES | 15 GATE DELAYS | 53k GATES | 16 GATE DELAYS | 78k GATES | 16 GATE DELAYS | ASSUMES THE NUMBER OF TRANSFORMATION MATRIX IS $n^2/2$ |
| G. Orlando et. al | 571 GATES | 4 GATE DELAYS | 816 GATES | 4 GATE DELAYS | 991 GATES | 4 GATE DELAYS | EXCLUDES COMPLEXITY OF MULTIPLIER |
| C. C. Wang et. al | 26k GATES | 15 GATE DELAYS | 53k GATES | 16 GATE DELAYS | 78k GATES | 16 GATE DELAYS | ASSUMES THE NUMBER OF TRANSFORMATION MATRIX IS $n^2/2$ |
| PRESENT INVENTION | 256 XORs | 3 XOR GATE DELAYS | 153 XORs | 1 XOR GATE DELAY | 446 XORs | 3 XOR GATE DELAYS | |

FIG. 9

| CONVENTIONAL ART | STANDARD FINITE FIELD (SEC, ANSI X9.62) | | BASIS CONVERSION | OTHER |
|---|---|---|---|---|
| | DIMENSION | DEFINING POLYNOMIAL | | |
| H.Wu | APPLICABLE | APPLICABLE TO MOST TRINOMIALS | NO | INAPPLICABLE TO PENTANOMIAL AS DEFINING POLYNOMIAL |
| C.H.Kim et al. | INAPPLICABLE | IRRELATIVE | IRRELATIVE | USES AOP AS DEFINING POLYNOMIAL SO INCOMPATIBLE WITH STANDARDS |
| K.Aoki et al. | PARTIALLY APPLICABLE | IRRELATIVE | IRRELATIVE | USES PARTIAL FINITE FIELD OPERATION, SO INCOMPATIBLE WITH STANDARDS |
| Lambert et al. | APPLICABLE | | HIGH COMPLEXITY | APPLICABLE TO ALL CASES BUT REQUIRES COMPLEX BASIS CONVERSION |
| G.Orlando.et al. | APPLICABLE | | NO | APPLICABLE TO ALL CASES BUT HAS HIGH COMPLEXITY |
| C.C.Wang et al. | APPLICABLE | INAPPLICABLE TO MOST CASES | NO | APPLICABLE FINITE FIELDS ARE RARELY SHOWN IN STANDARDS |
| PRESENT INVENTION | APPLICABLE | | NO | APPLICABLE TO MOST CASES |

METHOD AND APPARATUS TO PERFORM SQUARING OPERATION IN FINITE FIELD

CROSS-REFERENCE TO RELATED APPLICATIONS

This application claims the benefit of Korean Patent Application Nos. 2003-38684, filed on Jun. 16, 2003 and 2003-77329, filed on Nov. 3, 2003, in the Korean Intellectual Property Office, the disclosures of which are incorporated herein by reference.

BACKGROUND OF THE INVENTION

1. Field of the Invention

The present invention relates to a method and apparatus to perform a squaring operation in a finite field.

2. Description of the Related Art

A finite field $GF(2^n)$ is a number system containing $2^n$ elements. Based on the fact that each element of the finite field $GF(2^n)$ can be represented by n bits, practical applications of the finite field can be accomplished. Practical applications, such as hardware implementation of error correction codes and elliptic curve cryptosystems, frequently perform calculations in $GF(2^n)$. An apparatus for encoding/decoding Reed-Solomon codes performs calculations in GF(2n), and an encryption/decryption apparatus of an elliptic curve cryptosystem performs calculations in GF(2n) where "n" is a large value.

The addition and multiplication rules of GF(2), which contain only binary numbers 0 and 1, are defined by Formula (1).

$$0+0=1+1=0$$
$$0+1=1+0=1$$
$$0\times 0=1\times 0=0\times 1=0$$
$$1\times 1=1 \qquad (1)$$

Here, binary addition is a bitwise exclusive OR (referred to as XOR hereinafter) operation, and binary multiplication is a bitwise AND (referred to as AND hereinafter) operation.

Since the finite field $GF(2^n)$ (n>1) is a number system containing $2^n$ elements, addition and multiplication correspond to arithmetic modulo of an irreducible n-degree polynomial having coefficients in GF(2). The irreducible n-degree polynomial is referred to as a defining polynomial of the finite field. When a root of the defining polynomial is $\alpha$, an element of the finite field has a standard representation given by Formula (2).

$$a_0+a_1\alpha+a_2\alpha^2+\ldots+a_{n-1}\alpha^{n-1}=(a_0,a_1,a_2,\ldots,a_{n-1}),$$
$$a_i \in GF(2) \qquad (2)$$

Multiplication of two elements in the finite field $GF(2^n)$ is given by polynomial multiplication of a and then modulo operation by the defining polynomial. Addition of two elements of the finite field GF(2n) is performed by polynomial addition of $\alpha$.

Assume that the defining polynomial of the finite field $GF(2^n)$ is expressed as shown in Formula (3) and $\alpha$ is a root of the defining polynomial.

$$f(x) = x^n + \sum_{i=1}^{t} x^{k_i} + 1 \qquad (3)$$

where n is an arbitrary natural number, 0<t, and $k_t$<n.

If an element A of the finite field is expressed as $A=(a_0,a_1,a_2,\ldots,a_{n-1})\in GF(2^n)$, the square of the element A is determined by polynomial multiplication of $\alpha$ and then modulo operation by the polynomial $f(\alpha)$.

$$A^2 \equiv (a_0+a_1\alpha+a_2\alpha^2+\ldots+a_{n-1}\alpha^{n-1})^2 \bmod f(\alpha) \qquad (4)$$

Conventional techniques of performing a squaring operation as shown in Formula (4) will be explained below. Here, the size of hardware, namely, the number of gates, serves as a measure for area complexity, and gate delays of the hardware serve as a measure for time complexity. Cryptographic standards, such as SEC and ANSI X9.62, define coefficients necessary for the elliptic curve cryptosystems and recommend several coefficients in the finite field. The two standards are most widely used to determine coefficients in the finite field. Accordingly, the two standards are used as criteria in deciding wide applicability of the respective techniques. Here, n represents the dimension of the finite field.

The invention by H. Wu entitled "Bit-parallel finite field multiplier and squarer using polynomial basis (IEEE Transactions on Computers, Vol. 51, No. 7, pp. 750-758, 2002)" discloses an arrangement of squaring results for values of n and k when a defining polynomial is a trinomial given by $x^n+x^k+1$. Since the formula adopted by the Wu's invention is optimized, high efficiency in area and time complexity can be achieved. But, Wu's invention does not cover the case when the defining polynomial is a pentanomial.

The invention by C. H. Kim et al. entitled "A new hardware architecture for operations in GF(2n) (IEEE Transactions on Computers, Vol. 51, No. 1, pp. 90-92, 2002)" discloses that when n+1 is a prime number, $2 \in Z_{n+1}$ is a primitive element in GF(2n), an anomalous basis is used, and a defining polynomial is an all-one polynomial (AOP), squaring can be achieved by rewiring, where rewiring means redefining relationships among elements and/or inserting new elements into a matrix. But, the pertinent n and the defining polynomial for Kim's invention are not found in the standards.

The invention by K. Aoki et al. entitled "Scheme for arithmetic operations in finite field and group operations over elliptic curves realizing improved computational speed (U.S. Pat. Nos. 6,266,688 and 6,202,076, 2001)" discloses that when n is even and the finite field GF(2n) meets a condition of $GF(2)<GF(2^{n/2})<GF(2^n)$, arithmetic operations in the finite field GF(2n) can be performed using arithmetic operations in the finite field GF(2n/2), and suggests a square calculation device using the scheme. But when using the Aoki device, a way of representing the finite field is different from that in the standards, resulting in poor compatibility. Further, since most of "n"s in the standards are odd, the invention by K. Aoki et al. is rarely applicable.

The invention by Lambert et al. entitled "Method and apparatus for implementing arithmetical operations in finite fields (EU Pat. No. 1,076,284 A1, 2001)" performs a squaring operation using a cyclic basis. The cyclic basis is $1, \alpha^\Delta, \alpha^{2\Delta}, \alpha^{3\Delta}, \ldots, \alpha^{(m-1)\Delta}$ where $\Delta$, the smallest divisor of 2n−1, satisfies $m=(2^n-1)/\Delta \geq n$, $\Delta \geq n$. In this case, the squaring operation is implemented by rewiring. But the invention requires basis conversion, which is very complex since the factor $\Delta$ satisfying the above condition is fairly large.

The invention by G. Orlando et al. entitled "Squaring architecture for GF(2n) and its application in cryptographic systems (Electronics Letters, Vol. 36, No. 13, pp. 1116-1117, 2000)" discloses a method of dividing an element according to predetermined fundamentals and inputting the divided element to a multiplier. The squaring architecture includes 3.5 n gates as well as the multiplier. Accordingly, the invention by G. Orlando et al. is less efficient than the invention by H. Wu employing approximately n/2 gates.

The invention by C. C. Wang et al. entitled "VLSI architectures for computing multiplications and inverses in GF(2m) (IEEE Transactions on Computers, Vol. C-34, No. 8, pp. 709-717, 1985)" utilizes a normal basis such that a squaring operation is implemented by rewiring. But basis conversion required by the invention is very complex.

Accordingly, there is a demand for a method and apparatus for performing a squaring operation that does not require complex basis conversion and has low area and time complexity.

SUMMARY OF THE INVENTION

The present invention provides a method and apparatus to perform a squaring operation in a finite field by defining coefficients necessary for the squaring operation using a defining polynomial of the finite field, performing exclusive OR (referred to as XOR hereinafter) operations on the defined coefficients, and rewiring results of the XOR operation.

According to an aspect of the present invention, there is provided a method to perform a squaring operation on an element A when a defining polynomial of a finite field $GF(2^n)$ is expressed as $$f(x) = x^n + \sum_{i=1}^{t} x^{k_i} + 1$$

where n is odd, and the element A contained in the finite field is expressed as $A=(a_0, a_1, a_2, \ldots, a_{n-1}) \in GF(2^n)$, the method comprising: determining predefined coefficients $m_i$, $I_{ij}$, $V_0$, $V_{ij}$, and V, such that the coefficient $m_i$ satisfies a predetermined condition with respect to $k_i$ when $0 \leq i \leq t$ is a natural number, the coefficient $I_{ij}$ depends on n, $k_i$, and j when $2 \leq j \leq m_i$, the coefficients $V_0$ and $V_{ij}$ of n bits, respectively, depend on n, $I_{ij}$, and $k_i$, and obtaining the coefficient V with respect to $m_i$ according to the following formula;

$$V_i = V_{i2} \oplus V_{i3} \oplus \ldots \oplus V_{im_i}$$

$$V = V_0 \oplus \sum_{m_i \neq 0} V_i;$$

determining a predefined coefficient $s_i$ according to $k_i$ and n and cyclically shifting the coefficient V by $s_i$; performing XOR operations on the cyclically shifted coefficient V and the element A; and rewiring a result of the XOR operations in a predefined order and outputting results of the squaring operation.

According to another aspect of the present invention, there is provided an apparatus to perform a squaring operation on an element A when a defining polynomial of a finite field $GF(2^n)$ is expressed as $$f(x) = x^n + \sum_{i=1}^{t} x^{k_i} + 1$$

where n is odd, and the element A of the finite field is expressed as $A=(a_0, a_1, a_2, \ldots, a_{n-1}) \in GF(2^n)$, the apparatus comprising: a coefficient calculating unit, which calculates coefficients necessary for the squaring operation by: determining predefined coefficients $m_i$, $I_{ij}$, $V_0$, $V_i$, and V such that the coefficient m1 satisfies a predetermined condition with respect to $k_i$ when $0 \leq i \leq t$ is a natural number, the coefficient $I_{ij}$ depends on n, $k_i$, and j when $2 \leq j \leq m_i$, the coefficients $V_0$ and $V_{ij}$ of n bits, respectively, depend on n, $I_{ij}$, and $k_i$, and obtaining the coefficient V with respect to $m_i$ according to the following formula;

$$V_i = V_{i2} \oplus V_{i3} \oplus \ldots \oplus V_{im_i}$$

$$V = V_0 \oplus \sum_{m_i \neq 0} V_i;$$

and determining a predefined coefficient $s_i$ according to $k_i$ and n and cyclically shifting the coefficient V by $s_i$; an XOR operating unit, which includes a plurality of XOR gates and performs XOR operations on input A according to results of the calculated coefficient unit; and a rewiring unit, which rewires outputs of the XOR operating unit in a predefined order and outputs final results of the squaring operation.

According to still another aspect of the present invention, there is provided a method to perform a squaring operation on an element A when a defining polynomial of a finite field $GF(2^n)$ is expressed as $$f(x) = x^n + \sum_{i=1}^{t} x^{k_i} + 1$$

where n is even, and the element A of the finite field is expressed as $A=(a_0, a_1, a_2, \ldots, a_{n-1}) \in GF(2^n)$, the method comprising: determining predefined coefficients $m_i$, $I_{ij}$, $V_0$, $V_{ij}$, and V, such that the coefficient $m_i$ satisfies a predetermined condition with respect to $k_i$ when $1 \leq i \leq t$ is a natural number, the coefficient $I_{ij}$ depends on n, $k_i$, and j when $2 \leq j \leq m_i$, the coefficients $V_0$ and $V_{ij}$ of n bits, respectively, depend on n, $I_{ij}$, and $k_i$, and obtaining the coefficient V with respect to $m_i$ according to the following formula;

$$V_i = V_{i2} \oplus V_{i3} \oplus \ldots \oplus V_{im_i}$$

$$V = V_0 \oplus \sum_{m_i \neq 1} V_i;$$

determining a predefined coefficient $s_i$ according to $k_i$ and n and cyclically shifting the coefficient V by $s_i$ according to a predetermined formula; obtaining an element $\overline{A}$ from the element A and performing XOR operations on the cyclically shifted coefficient V with the element $\overline{A}$; and rewiring a result of the XOR operations in a predefined order and outputting results of the squaring operation.

According to yet another aspect of the present invention, there is provided an apparatus to perform a squaring operation on an element A when a defining polynomial of a finite field $GF(2^n)$ is expressed as $$f(x) = x^n + \sum_{i=1}^{t} x^{k_i} + 1$$

where n is even, and the element A of the finite field is expressed as $A=(a_0, a_1, a_2, \ldots, a_{n-1}) \in GF(2^n)$, the apparatus comprising: a coefficient calculating unit, which calculates coefficients necessary for the squaring operation by: determining predefined coefficients $m_i$, $I_{ij}$, $V_0$, $V_{ij}$, and V such that the coefficient $m_i$ satisfies a predetermined condition with respect to $k_i$ when $1 \leq i \leq t$ is a natural number, the coefficient $I_{ij}$ depends on n, $k_i$, and j when $2 \leq j \leq m_i$, the coefficients $V_0$ and $V_{ij}$ of n bits, respectively, depend on n, $I_{ij}$, and $k_i$, and obtaining the coefficient V with respect to $m_i$ according to the following formula; and $$V_i = V_{i2} \oplus V_{i3} \oplus \ldots \oplus V_{im_i}$$

$$V = V_0 \oplus \sum_{m_i \neq 0} V_i$$

determining a predetermined coefficient $s_i$ according to $k_i$ and n and cyclically shifting the coefficient V by $s_i$ according to a predetermined formula; an XOR operating unit, which includes a plurality of XOR gates, and which obtains an element $\overline{A}$ from the input element A according to a second predetermined formula, and performs XOR operations on results of the cyclic shift operation received from the coefficient calculating unit with the element $\overline{A}$; and a rewiring unit, which rewires an output of the XOR operating unit and outputs final results of the squaring operation.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a table illustrating a comparison of area and time complexity between the conventional art and embodiments of the present invention;

FIG. 8 is a table illustrating a comparison of area and time complexity in three finite fields defined by SEC standards between the conventional art and an embodiment of the present invention; and FIG. 9 is a table illustrating a comparison of applicability to the standards, basis conversion, and problem between the conventional art and an embodiment of the present invention.

DETAILED DESCRIPTION OF THE PREFERRED EMBODIMENTS

Figure 1:
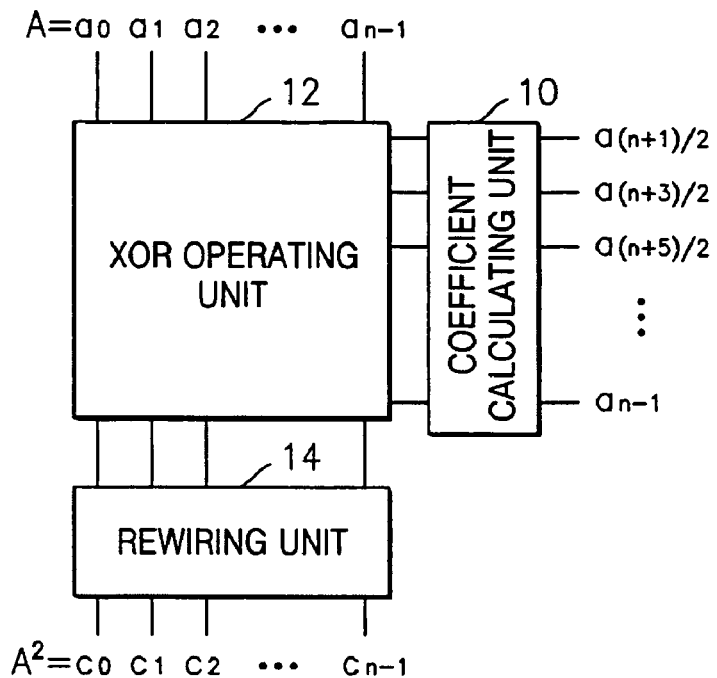
FIG. 1 is a block diagram of an apparatus to perform a squaring operation in a finite field according to a first embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus to perform a squaring operation in a finite field $GF(2^n)$ according to a first embodiment of the present invention when n is odd. Referring to FIG. 1, the apparatus includes a coefficient calculating unit 10, an XOR operating unit 12, and a rewiring unit 14.

The coefficient calculating unit 10 calculates coefficients necessary for the squaring operation of a defining polynomial. The XOR operating unit 12 performs XOR operations on coefficients output from the coefficient calculating unit 10. The rewiring unit 14 rewires outputs of the XOR operating unit 12 and outputs final coefficients of the squaring operation.

The operation of the apparatus to perform the squaring operation when n is odd will now be explained in further detail.

Assume that the defining polynomial of $GF(2^n)$ is defined by Formula (5).

$$f(x) = x^n + \sum_{i=1}^{t} x^{k_i} + 1 \quad (5)$$

If an element A of the finite field is expressed as $A=(a_0, a_1, a_2, \ldots, a_{n-1}) \in GF(2^n)$, the square $A^2$ of the element A may be expressed by Formula (6).

$$A^2 \equiv (a_0 + a_1\alpha + a_2\alpha^2 + \ldots + a_{n-1}\alpha^{n-1})^2 \bmod f(\alpha) \quad (6)$$
$$= c_0 c_1 c_2 \ldots c_{n-1} = C$$

The square $A^2$ directs to a vector C, which also belongs to $GF(2^n)$.

In Formula (5), $x^n + 1$ and $$\sum_{i=1}^{t} x^{k_i}$$

add up to the defining polynomial f(x), and area and time complexity of a multiplier are determined by n, t, and $k_i$.

Coefficients $m_i$, $I_{ij}$, I, $V_0$, $V_{ij}$, and V, necessary for obtaining the components of the vector C, are defined as follows.

If $k_i=1$ for $i=1, 2, \ldots, t$, the coefficient $m_i=0$.
If $k_i$ satisfies the following Formula (7)

$$\frac{(r-2)n+1}{r-1} < k_i \leq \frac{(r-1)n+1}{r} \quad (7)$$

where $r \geq 2$ is an integer, it is defined that the coefficient $m_i=r$.

When $m_i$ is not 0, the coefficient $I_{ij}$ (i=1,2, . . . ,t, and j=2,3, . . . , $m_i$) is defined by Formula (8).

$$I_{ij} = \frac{n-1}{2} - \left\lfloor (j-1)\frac{n-k_i}{2} \right\rfloor \qquad (8)$$

If $k_i$ is even, the coefficient I is defined by Formula (9).

$$I = \max\{I_{i2} | k_i : \text{even}\} \qquad (9)$$

If $k_i$ is not even, the coefficient I=0.
The coefficient $V_0$ is defined by Formula (10).

$$V_0 = \underbrace{a_{\frac{n+1}{2}} a_{\frac{n+3}{2}} \ldots a_{n-1} 0 0 \ldots 0}_{n\ bits} \qquad (10)$$

The coefficient $V_{ij}$ is defined as follows when $m_i \neq 0$. Both when $k_i$ is odd and when $k_i$ is even and j is odd, the coefficient $V_{ij}$ is defined by Formula (11).

$$V_{ij} = \underbrace{a_{n-l_{ij}} a_{n-l_{ij}+1} \ldots a_{n-1} 0 0 \ldots 0}_{n\ bits} \qquad (11)$$

When both $k_i$ and j are even, the coefficient $V_{ij}$ is defined by Formula (12).

$$V_{ij} = \underbrace{0 \ldots 0}_{\frac{n-1}{2} bits} \underbrace{a_{n-l_{ij}} a_{n-l_{ij}+1} \ldots a_{n-1} 0 0 \ldots 0}_{\frac{n+1}{2} bits} \qquad (12)$$

The coefficient calculating unit 10 obtains the coefficients $V_i$ and V from the already obtained coefficients by Formula (13).

$$V_i = V_{i2} \oplus V_{i3} \oplus \ldots \oplus V_{im_i} \qquad (13)$$
$$V = V_0 \oplus \sum_{m_i \neq 0} V_i$$

Next, a coefficient $s_i$ dependent on $k_i$ (i=1,2, . . . ,t) is defined by Formula (14).

$$s_i = \begin{cases} \frac{k_i+1}{2} & k_i : \text{odd,} \\ \frac{k_i+1+n}{2} & k_i : \text{even} \end{cases} \qquad (14)$$

A cyclic shift operation is performed on the coefficient V for respective $s_1$ through $s_t$ obtained from Formula (14), XOR operations are performed on results of the cyclic shift operation, and one more XOR operation is performed with the element A. A result C' of the XOR operations may be expressed by Formula (15).

$$C' = A \oplus (V \gg s_1) \oplus \ldots \oplus (V \gg s_t) \qquad (15)$$

The result C' obtained from Formula (15) is represented as an XOR operation formula on the element A. The XOR operating unit 12 performs the XOR operation according to Formula (15).

If the result C' obtained from Formula (15) is expressed as C'=$c_0' c_1' \ldots c_{n-1}'$, $c_i$ of the square $A^2 = c_0 c_1' \ldots c_{n-1}$ is obtained from the result C' by Formula (16)

$$c_i = c_j'(i \equiv 2j \bmod n) \qquad (16)$$

The rewiring unit 14 rewires the results obtained from Formula (15) according to Formula (16) and outputs final results of the squaring operation.

The area and time complexity of the apparatus constructed as above are calculated as follows. The apparatus according to the first embodiment performs only XOR operations. The number of times the XOR operations are performed is given by Formula (17).

$$\underbrace{-I + \sum_{m_i \neq 0} l_{i2} + l_{i3} + \ldots + l_{im_i}}_{step\ 1} \geq \underbrace{+t\left(\frac{n-1}{2} + I\right)}_{step\ 2} + \underbrace{0}_{step\ 3} \qquad (17)$$

Since the third operation only requires the rewiring operation, no XOR operations are performed in the third operation. In particular, when t=1, that is, when the defining polynomial is a trinomial, if $k_1$ satisfies Formula (18), $$1 < k_1 \leq \frac{n+1}{2} \qquad (18)$$

then the number of XOR operations performed is given by Formula (19).

$$\begin{cases} \underbrace{\frac{k_1-1}{2}}_{step\ 1} + \underbrace{\frac{n-1}{2}}_{step\ 2} & k_1 : \text{odd,} \\ \underbrace{0}_{step\ 1} + \underbrace{\frac{n-1}{2} + \frac{k_1}{2}}_{step\ 2} & k_i : \text{even} \end{cases} \qquad (19)$$

It is difficult to explain the time complexity of the apparatus exactly. Thus, a case of the worst time complexity can be explained. Since the squaring apparatus according to the first preferred embodiment of the present invention employs only XOR gates, gate delays can serve as a measure of the time complexity. The maximum delay due to the XOR gates is determined by Formula (20).

$$\left\lceil \log_2\left(1 + t + \sum_{m_i \neq 0}(m_i - 1)\right) \right\rceil \qquad (20)$$

Particularly, when t=1 and $k_i$ satisfies Formula (18), an XOR gate delay is expressed by Formula (21).

$$\begin{cases} 2 & k_1 : \text{odd,} \\ 1 & k_i : \text{even} \end{cases} \qquad (21)$$

As an example, calculation results of the coefficients and the complexity will now be explained when n=11, in the first embodiment. When the defining polynomial is expressed as $x^{11}+x^2+1$, t=1 and $k_1=2$. Coefficients necessary for the squaring operation are determined from the n, t, and $k_i$ as follows. According to Formulae (7) through (11), $m_1=2$, $I_{12}=1$, $I=1$, $V_0=a_6a_7a_8a_9a_{10}000000$, and $V_{12}=00000a_{10}00000$. Using the coefficients $m_1$, $I_{12}$, I, $V_0$, and $V_{12}$, $V_1=00000a_{10}00000$ and $V=a_6a_7a_8a_9a_{10}a_{10}00000$ are obtained according to Formula (13).

The coefficient $s_1$ is determined as $s_1=7$ according to Formula (14). According to Formula (15), the vector C' is determined by Formula (22).

$$C' = A \oplus (V \gg 7)$$
$$= A \oplus a_{10}a_{10}00000a_6a_7a_8a_9$$
$$= (a_0 \oplus a_{10})(a_1 \oplus a_{10})a_2a_3a_4a_5a_6(a_7 \oplus a_6)$$
$$(a_8 \oplus a_7)(a_9 \oplus a_8)(a_{10} \oplus a_9)$$

If the rewiring operation with respect to C' is implemented according to Formula (14), the square $A^2=c_0c_1c_2 \ldots c_9c_{10}$ is obtained by Formula (23).

$$A^2=(a_0 \oplus a_{10})a_6(a_1 \oplus a_{10})(a_7 \oplus a_6)a_2(a_8 \oplus a_7)a_3(a_9 \oplus a_8)$$
$$a_4(a_{10} \oplus a_9)a_5 \qquad (23)$$

Figure 2:
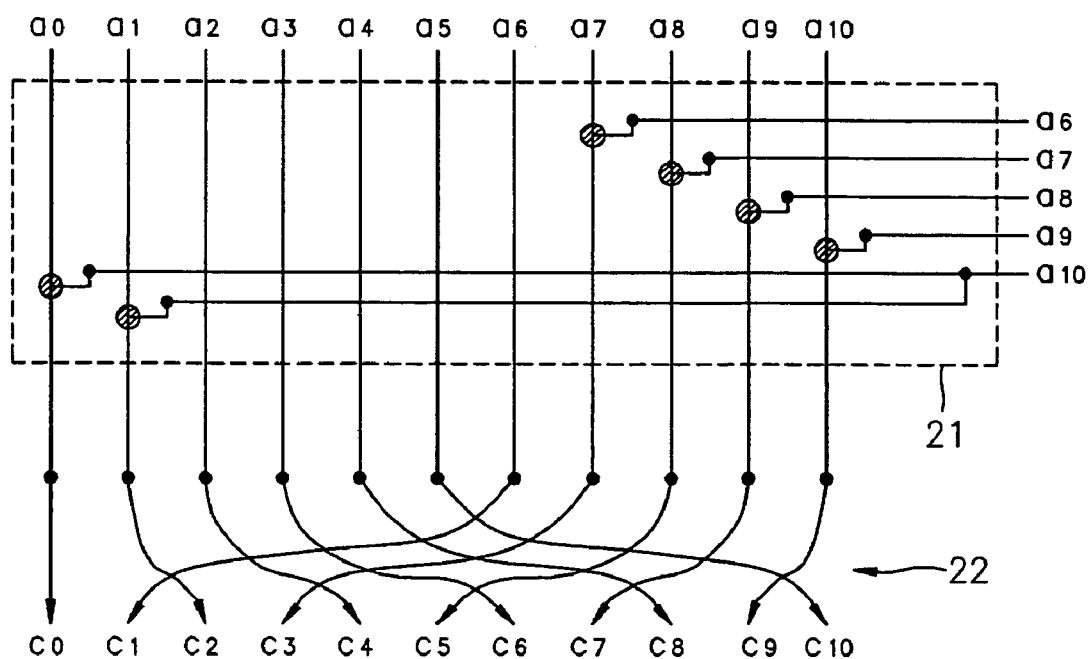
FIG. 2 illustrates an implementation result of Formula (23) using a plurality of exclusive OR gates and a rewiring unit.

FIG. 2 illustrates an implementation result of Formula (23) obtained using a plurality of XOR gates 21 and a rewiring unit 22.

Referring to FIG. 2, the squaring apparatus includes six XOR gates contributing to area complexity, and has one gate delay contributing to time complexity.

For another example, the case where the defining polynomial is $x^{11}+x^4+x^2+x+1$ will now be explained. According to the defining polynomial, $t=3$, $k_1=1$, $k_2=2$, and $k_3=4$.

Coefficients obtained from t, $k_1$, $k_2$, and $k_3$ are expressed by Formula (24).

$$m_1=0, m_2=m_3=2$$
$$l_{22}=1, l_{32}=2$$
$$l=2$$
$$V_0=a_6a_7a_8a_9a_{10}000000$$
$$V_{22}=00000a_{10}00000, V_{32}=00000a_9a_{10}0000 \qquad (24)$$

From the coefficients of Formula (24), $V_2=00000a_{10}00000$ and $V_3=00000a_9a_{10}0000$ are obtained. The coefficient V is determined by Formula (25).

$$V=a_6a_7a_8a_9(a_{10} \oplus a_9)a_{10}00000 \qquad (25)$$

According to Formula (14), it is determined that $s_1=1$, $s_2=7$, and $s_3=8$. Accordingly, the vector C' is determined by Formula (26).

$$C' = A \oplus (V \gg 1) \oplus (V \gg 7) \oplus (V \gg 8) \qquad (26)$$
$$= (a_0 \oplus a_9 \oplus a_{10})(a_1 \oplus a_6 \oplus a_{10} \oplus a_9 \oplus a_{10})$$
$$(a_2 \oplus a_7 \oplus a_9 \oplus a_{10} \oplus a_{10})(a_3 \oplus a_8 \oplus a_{10})$$
$$(a_4 \oplus a_9)(a_5 \oplus a_{10})(a_6 \oplus a_9 \oplus a_{10})(a_7 \oplus a_6 \oplus a_{10})$$
$$(a_8 \oplus a_6 \oplus a_7)(a_9 \oplus a_7 \oplus a_8)(a_{10} \oplus a_8 \oplus a_9)$$

If rewiring is performed according to Formula (16), the vector C (in other words, $A^2$) is obtained by Formula (27).

$$A^2=(a_0 \oplus a_9 \oplus a_{10})(a_6 \oplus a_9 \oplus a_{10})(a_1 \oplus a_6 \oplus a_{10} \oplus a_9 \oplus a_{10})$$
$$(a_7 \oplus a_6 \oplus a_{10})(a_2 \oplus a_7 \oplus a_9 \oplus a_{10} \oplus a_{10})$$
$$(a_8 \oplus a_6 \oplus a_7)(a_3 \oplus a_8 \oplus a_{10})(a_9 \oplus a_7 \oplus a_8)(a_4 \oplus a_9)$$
$$(a_{10} \oplus a_8 \oplus a_9)(a_5 \oplus a_{10}) \qquad (27)$$

Figure 3:
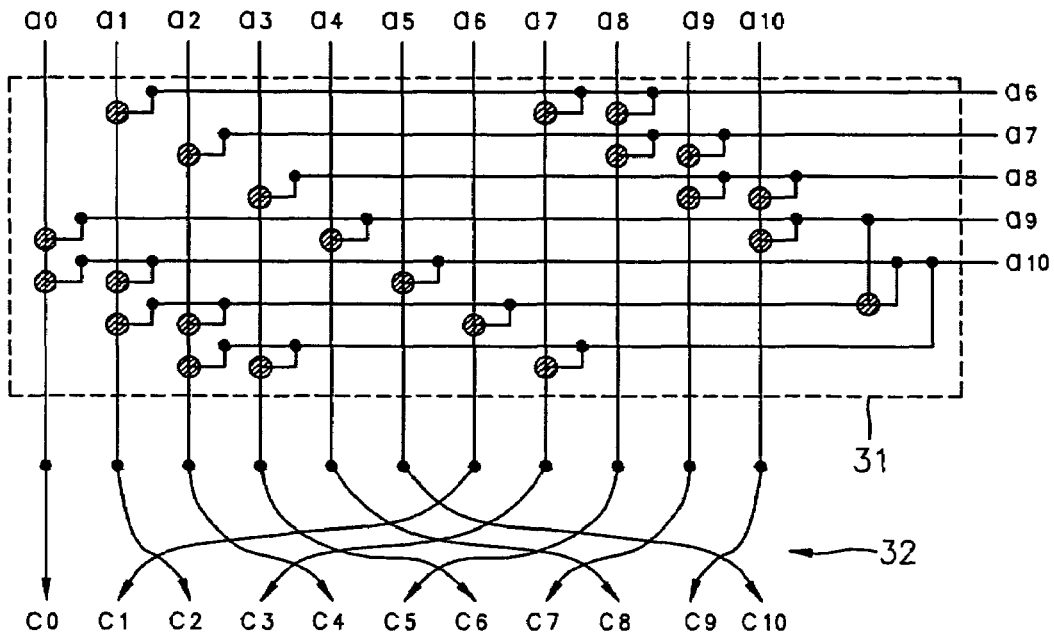
FIG. 3 illustrates an implementation result of Formula (27) using a plurality of XOR gates and a rewiring unit.
Figure 4:
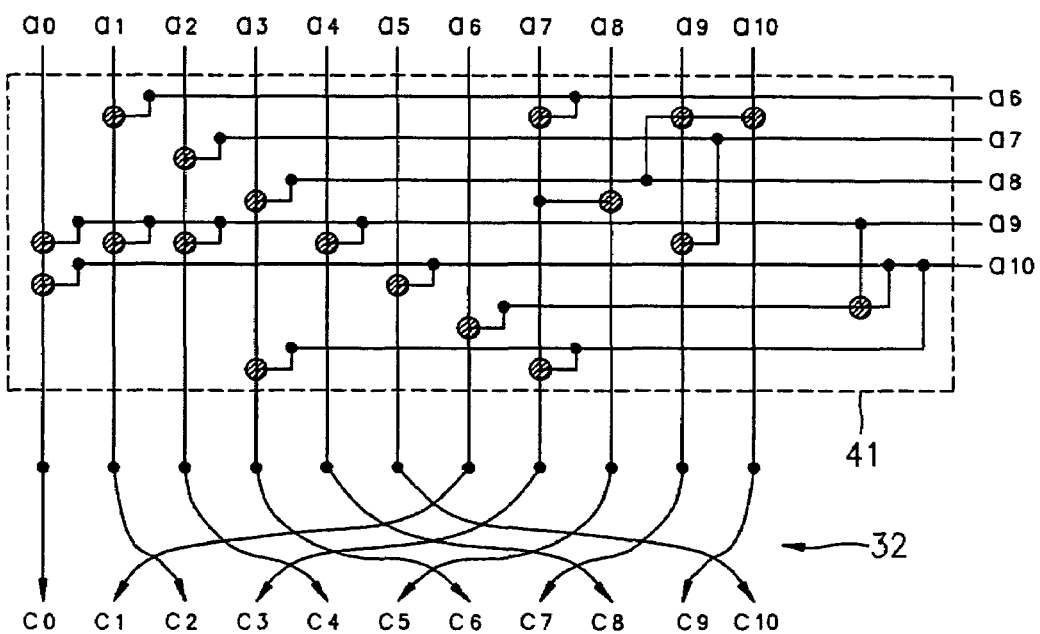
FIG. 4 illustrates a result obtained after reducing a number of the XOR gates of FIG. 3.

FIG. 3 illustrates an implementation result of Formula (27) using a plurality of XOR gates 31 and a rewiring unit 32. FIG. 4 illustrates a result obtained with a reduced number of XOR gates 41. For example, since $a_{10} \oplus a_{10}=0$ in $a_1 \oplus a_6 \oplus a_{10} \oplus a_9 \oplus a_{10}$ corresponding to $c_2$ of the vector C of Formula (27), only $a_1 \oplus a_6 \oplus a_9$ needs to be performed. Accordingly, the number of the XOR gates can be reduced. For another example, when $c_3=a_8 \oplus a_6 \oplus a_7$, if $a_7 \oplus a_6$, which also exists in $c_3=a_7 \oplus a_6 \oplus a_{10}$, is reused, the number of the XOR gates used in calculating $c_5$ can be further reduced. FIG. 4 illustrates results obtained after reducing the number of the XOR gates 41 in the aforesaid manner.

Figure 5:
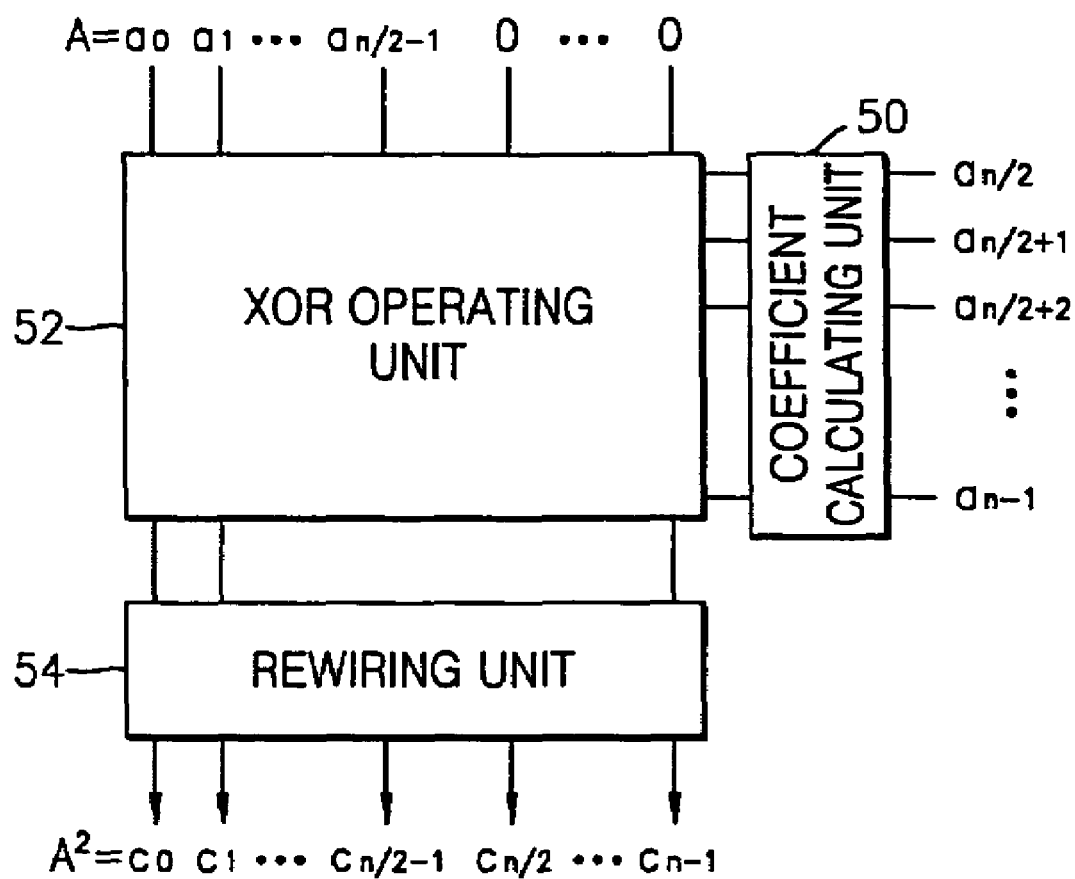
FIG. 5 is a block diagram of an apparatus to perform a squaring operation in a finite field according to a second embodiment of the present invention.

FIG. 5 is a block diagram of an apparatus to perform a squaring operation in a finite field $GF(2^n)$ according to a second embodiment of the present invention when n is even. The apparatus according to the second embodiment includes a coefficient calculating unit 50, an XOR operating unit 52, and a rewiring unit 54.

The coefficient calculating unit 50 calculates coefficients necessary for the squaring operation using a defining polynomial. The XOR operating unit 52 performs XOR operations on coefficients output from the coefficient calculating unit 50. The rewiring unit 54 rewires the outputs of the XOR operating unit 52 and outputs final results of the squaring operation.

The operation of the apparatus of the second embodiment will now be explained in further detail.

If the defining polynomial of $GF(2^n)$ where n is even is defined by Formula (5) in the same manner as where n is odd, when an element A contained in the finite field is expressed as $A=(a_0,a_1,a_2, \ldots ,a_{n-1}) \in GF(2^n)$, the square $A^2$ of the element A may be expressed by Formula (6). The result C of the squaring operation in Formula (6) is also contained in $GF(2^n)$.

Coefficients $m_i$, $I_{ij}$, I, $V_0$, $V_{ij}$, and V necessary for obtaining components of the vector C are defined as the follows.

If $k_i=1$ (i=1,2, . . . ,t), then it is set that $m_i=1$.

If $k_i$ satisfies Formula (28)

$$\frac{(r-2)n+1}{r-1} < k_i \leq \frac{(r-1)n+1}{r} \qquad (28)$$

when an integer $r \geq 2$, then the coefficient $m_i$ is defined to be r. When $m_i \neq 1$ (i=1,2, . . . ,t), the coefficient $I_{ij}$ (j=2,3, . . . ,$m_i$) is defined by Formula (29).

$$l_{ij} = \frac{n}{2} - (j-1)\frac{n}{2} + \left\lfloor (j-1)\frac{k_i}{2} \right\rfloor T \qquad (29)$$

The coefficient $V_0$ is defined by Formula (30).

$$V_0 = \underbrace{a_{n-\frac{n}{2}}a_{n-\frac{n}{2}+1} \ldots a_{n-1}00 \ldots 0}_{n \text{ bits}} \qquad (30)$$

When $m_i \neq 1$ (i=1,2,...,t) and $k_i$ is even, or when $m_i \neq 1$ and both $k_i$ and j are odd, then the coefficient $V_{ij}$ (j=2,3,...,$m_i$) is defined by Formula (31).

$$V_{ij} = \underbrace{a_{n-l_{ij}} a_{n-l_{ij}+1} \ldots a_{n-1} 0 0 \ldots 0}_{n \text{ bits}} \quad (31)$$

On the other hand, when $m_i \neq 1$, $k_i$ is odd, and j is even, then the coefficient $V_{ij}$ is defined by Formula (32).

$$V_{ij} = \underbrace{0 \ldots 0}_{\frac{n}{2} \text{ bits}} \underbrace{a_{n-l_{ij}} a_{n-l_{ij}+1} \ldots a_{n-1} 0 0 \ldots 0}_{\frac{n}{2} \text{ bits}} \quad (32)$$

The coefficient calculating unit 50 outputs final calculation results represented by Formula (33), obtained from the coefficients $m_i$, $V_0$, and $V_{ij}$ when $m_i \neq 1$.

$$V_i = V_{i2} \oplus V_{i3} \oplus \ldots \oplus V_{im_i} \quad (33)$$

$$V = V_0 \oplus \sum_{m_i \neq 1} V_i$$

A coefficient $s_i$ dependent on $k_i$ (i=1,2,...,t) is defined by Formula (34).

$$s_i = \begin{cases} \dfrac{n+k_i-1}{2} & k_i\text{:odd,} \\ \dfrac{k_i}{2} & k_i\text{:even} \end{cases} \quad (34)$$

Next, an element $\overline{A}$ is defined by Formula (35).

$$\overline{A} = \underbrace{(a_0 \oplus a_{\frac{n}{2}})(a_1 \oplus a_{\frac{n}{2}+1}) \cdots (a_{\frac{n}{2}-1} \oplus a_{n-1}) 0 \cdots 0}_{n \text{ bits}} \quad (35)$$

A shift operation marked by $\overline{\ggg}$ is expressed by Formula (36).

$$a_0 \ldots a_{\frac{n}{2}-1} a_{\frac{n}{2}} \ldots a_{n-1} \overline{\ggg} s = \begin{cases} a_{\frac{n}{2}-s} \ldots a_{\frac{n}{2}-1} a_0 \ldots a_{\frac{n}{2}-s-1} a_{n-s} \ldots a_{n-1} a_{\frac{n}{2}} \ldots a_{n-s-1} & s \leq \dfrac{n}{2}-1 \\ a_{n-s-1} \ldots a_{n-1} a_{\frac{n}{2}} \ldots a_{n-s+\frac{n}{2}-2} a_{\frac{n}{2}-s+\frac{n}{2}} \ldots a_{\frac{n}{2}-1} a_0 \ldots a_{\frac{n}{2}-s+\frac{n}{2}-1} & s \geq \dfrac{n}{2} \end{cases} \quad (36)$$

The shift operation is performed on the coefficient V according to Formula (36) with respect to $s_1$ through $s_t$ obtained from Formula (34), XOR operations are performed on results of the shift operation, and one more XOR operations is performed with the element $\overline{A}$ of Formula (35). If the result C of the XOR operations may be expressed by Formula (37), then the result C' obtained from Formula (37) is represented as an XOR operation formula with respect to the element A. The XOR operating unit 52 performs the XOR operation according to Formula (37).

$$C' = \overline{A} \oplus (V \overline{\ggg} s_1) \oplus \ldots \oplus (V \overline{\ggg} s_t) \quad (37)$$

If the result C' obtained from Formula (37) is expressed as $C' = c_0' c_1' \ldots c_{n-1}'$, $c_i$ of $A^2 = c_0 c_1 \ldots c_{n-1}$ is obtained from the result C' according to Formula (38).

$$c_i = \begin{cases} c_j' & \left(i = 2j,\ j \leq \dfrac{n}{2}-1\right) \\ c_j' & \left(i = 2j-n+1,\ j \geq \dfrac{n}{2}\right) \end{cases} \quad (38)$$

The rewiring unit 54 rewires the results obtained from Formula (37) according to Formula (38), and outputs final results of the squaring operation.

For example, the case where the defining polynomial is $x^{10}+x^4+x^3+x+1$ will be explained below. According to the defining polynomial, t=3, $k_1$=1, $k_2$=3, and $k_3$=4.

Coefficients obtained from the t, $k_1$, $k_2$, and $k_3$ are expressed by Formula (39).

$$m_1=1,\ m_2=m_3=2$$

$$l_{22}=1,\ l_{32}=2$$

$$V_0 = a_5 a_6 a_7 a_8 a_9 00000$$

$$V_{22}=00000a_9 0000,\ V_{32}=a_8 a_9 00000000 \quad (39)$$

According to Formula (33), $V_2$, $V_3$, and V are represented by Formula (40).

$$V_2=00000a_9 0000,\ V_3=a_8 a_9 00000000$$

$$V=(a_5 \oplus a_8)(a_6 \oplus a_9) a_7 a_8 a_9 a_9 0000 \quad (40)$$

According to Formula (34), it is determined that $s_1$=5, $s_2$=6, and $s_3$=2. According to Formulae 35 through 37, the result C' is determined as shown in Formula (41).

$$\begin{aligned} C' &= \overline{A} \oplus (V \overline{\ggg} 5) \oplus (V \overline{\ggg} 6) \oplus (V \overline{\ggg} 2) \quad (41)\\ &= (a_0 \oplus a_5 \oplus a_8)(a_1 \oplus a_6 \oplus a_9 \oplus a_9)(a_2 \oplus a_7 \oplus a_9 \oplus a_5 \oplus a_8)\\ &\quad (a_3 \oplus a_8 \oplus a_6 \oplus a_9)(a_4 \oplus a_9 \oplus a_7)(a_5 \oplus a_8 \oplus a_9)\\ &\quad (a_6 \oplus a_9 \oplus a_5 \oplus a_8)(a_7 \oplus a_6 \oplus a_9 \oplus a_9)(a_8 \oplus a_7)(a_9 \oplus a_8) \end{aligned}$$

If the result C' obtained from Formula (41) is rewired, the result of the squaring operation is obtained by Formula (42).

$$\begin{aligned} A^2 &= (a_0 \oplus a_5 \oplus a_8)(a_5 \oplus a_8 \oplus a_9)(a_1 \oplus a_6 \oplus a_9 \oplus a_9)\\ &\quad (a_6 \oplus a_9 \oplus a_5 \oplus a_8)(a_2 \oplus a_7 \oplus a_9 \oplus a_5 \oplus a_8)\\ &\quad (a_7 \oplus a_6 \oplus a_9 \oplus a_9)(a_3 \oplus a_8 \oplus a_6 \oplus a_9)(a_8 \oplus a_7)\\ &\quad (a_4 \oplus a_9 \oplus a_7)(a_9 \oplus a_8) \quad (42) \end{aligned}$$

Figure 6:
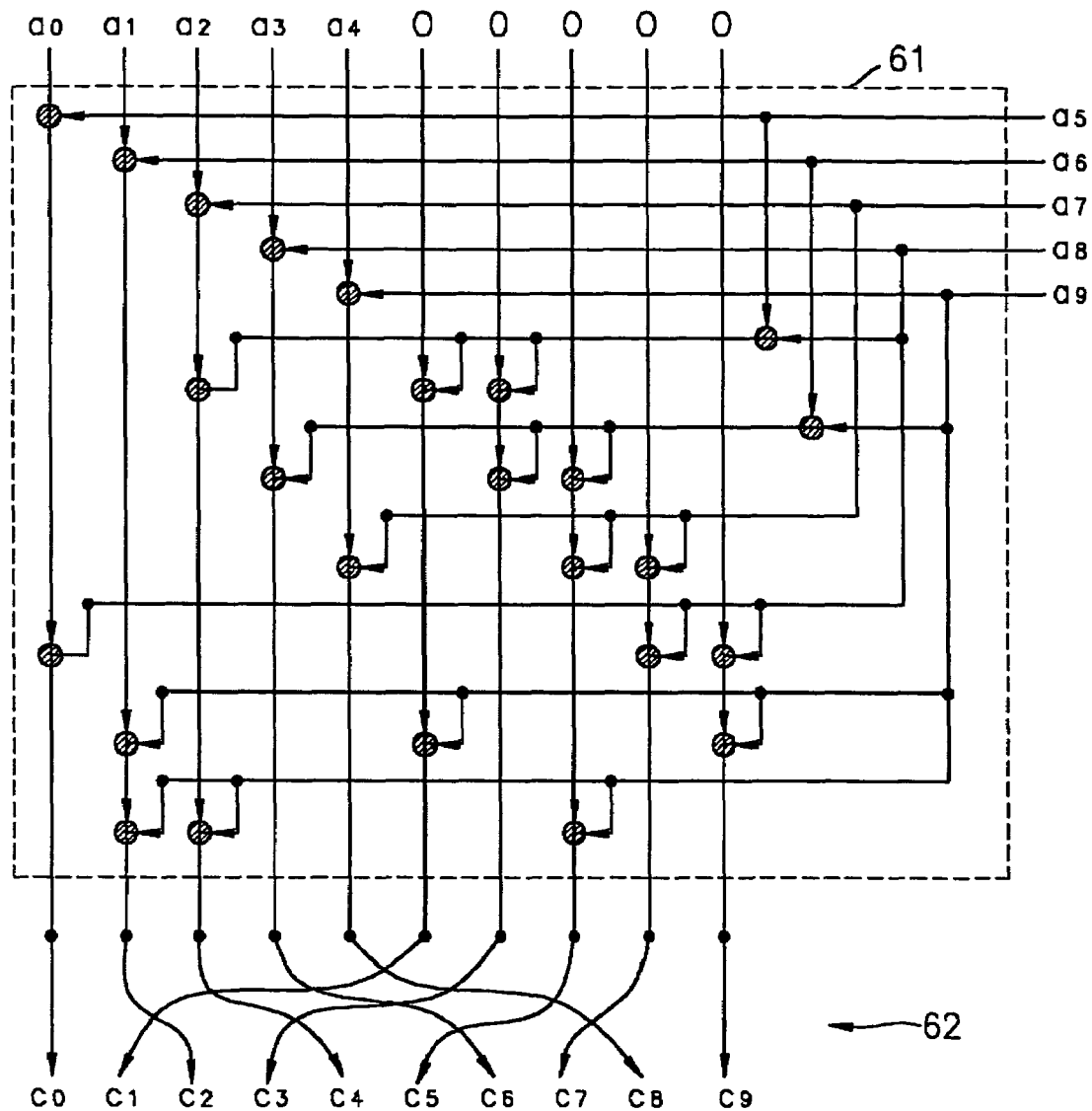
FIG. 6 illustrates an implementation result of Formula (42) using a plurality of XOR gates and a rewiring unit.

FIG. 6 illustrates an implementation result of Formula (42) using a plurality of XOR gates 61 and a rewiring unit 62. Referring to FIG. 6, the squaring apparatus includes twenty-five XOR gates contributing to area complexity and has four XOR gate delays contributing to time complexity.

FIGS. 7 through 9 are tables illustrating comparisons between the conventional art and embodiments of the present invention. Referring to FIG. 7, the present invention considers the case where the defining polynomial is a trinomial, that is, $x^n+x^k+1$ ($1 \leq k \leq n/2$) in terms of area and time complexity. FIG. 8 is a table illustrating a comparison of area and time complexity, in three finite fields defined by SEC standards between the conventional art and an embodiment of the present invention. It is assumed that an input of the squaring apparatus follows a standard representation. FIG. 9 is a table illustrating a comparison of applicability of standards, basis conversion, and problems between the conventional art and an embodiment of the present invention. It is assumed that an input of the squaring apparatus has a standard representation.

Referring to the tables, in terms of time and area complexity, embodiments of the present invention are superior, similar, or inferior to the conventional art according to different cases. But the invention by C. H. Kim, et al. uses a dimension and a defining polynomial that are not found in the standards, resulting in poor compatibility, and the invention by Lambert, et al. and the invention by C. C. Wang et al. require complex basis conversion. In general, basis conversion requires approximately $n^2$ gates and gate delays of approximately $\log_2 n$. If there is no method of efficient basis conversion, the conventional inventions are less efficient than the present invention. Further the invention by H. Wu is restricted to a trinomial as a defining polynomial, thereby having limitations in its application.

Even when n is even, embodiments of the present invention can be applied to any cases given in the standards, thereby achieving wide applicability.

As is described above, since the squaring apparatus according to an embodiment of the present invention is applicable to most cases in the standards, it has wide applicability and efficient area and time complexity. Also, the squaring apparatus does not require basis conversion. In addition, since the squaring apparatus can be applied when a trinomial and a pentanomial are used as the defining polynomial, it is superior to the conventional art in terms of applicability to the cases in the standards.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method to perform a squaring operation of an element A to output $A^2=C$ when a defining polynomial of a finite field $GF(2^n)$ is expressed as $$f(x) = x^n + \sum_{i=1}^{t} x^{k_i} + 1$$

where n is odd, and the element A contained in the finite field is expressed as $A=(a_0,a_1,a_2, \ldots ,a_{n-1}) \in GF(2^n)$, and $C=(c_0,c_1, \ldots, c_{n-1}) \in GF(2^n)$, the method comprising:

determining predefined coefficients $V_0$, $V_{ij}$, and $V$, and indices $m_i$, $I_{ij}$, such that the index $m_i$ satisfies a predetermined condition with respect to $k_i$ when $0 \leq i \leq t$ is a natural number, the index $I_{ij}$ depends on n, $k_i$, and j when $2 \leq j \leq m_i$, the coefficients $V_0$ and $V_{ij}$ of n bits, respectively, depend on n, $I_{ij}$, and $k_i$, and obtaining the coefficient V with respect to $m_i$ according to the following formula, $$V_i = V_{i2} \oplus V_{i3} \oplus \ldots \oplus V_{im_i}$$

$$V = V_0 \oplus \sum_{m_i \neq 0} V_i;$$

determining a predefined coefficient $s_i$ according to $k_i$ and n and cyclically shifting the coefficient V by $s_i$;

performing XOR operations on the cyclically shifted coefficient V and the element A; and rewiring terminals connected to receive a result of the XOR operations in a predefined order and outputting results of the squaring operation through the terminals as C.

2. The method of claim 1, wherein the index $m_i$ satisfies the following formula with respect to $k_i$ $$\begin{cases} m_i = 0 & k_i = 1 \\ m_i = r & \frac{(r-2)n+1}{r-1} < k_i \leq \frac{(r-1)n+1}{r}, r \geq 2. \end{cases}$$

3. The method of claim 1, wherein the index $I_{ij}$ is determined by the following formula $$l_{ij} = \frac{n-1}{2} - \left\lfloor (j-1)\frac{n-k_i}{2} \right\rfloor.$$

4. The method of claim 1, wherein the coefficient $V_0$ is determined by the following formula $$V_0 = \underbrace{a_{\frac{n+1}{2}} a_{\frac{n+3}{2}} \ldots a_{n-1} 0 0 \ldots 0}_{n \text{ bits}},$$

and the coefficient $V_{ij}$ is determined by the following formula $$V_{ij} = \underbrace{a_{n-l_{ij}} a_{n-l_{ij}+1} \ldots a_{n-1} 0 0 \ldots 0}_{n \text{ bits}}$$

when $k_i$ is odd, or when $k_i$ is even and j is odd, and the coefficient $V_{ij}$ is determined by the following formula $$V_{ij} = \underbrace{0 \ldots 0}_{\frac{(n-1)}{2} \text{ bits}} \underbrace{a_{n-l_{ij}} a_{n-l_{ij}+1} \ldots a_{n-1} 0 0 \ldots 0}_{\frac{(n+1)}{2} \text{ bits}}$$

when both $k_i$ and j are even.

5. The method of claim 1, wherein the coefficient $s_i$ is determined with respect to $k_i$ and n by the following formula $$s_i = \begin{cases} \frac{k_i+1}{2} & k_i:\text{odd} \\ \frac{k_i+1+n}{2} & k_i:\text{even}. \end{cases}$$

6. The method of claim 1, wherein, when the result of the XOR operations is expressed as $C'=c_0'c_1' \ldots c_{n-1}'$ and the square $A^2$ of the element A is expressed as $A^2=c_0c_1\ldots c_{n-1},c_i$ is obtained according to the following formula $c_i=c_j'(i\equiv 2j \bmod n)$.

7. An apparatus to perform a squaring operation on an element A to output $A^2=C$ when a defining polynomial of a finite field $GF(2^n)$ is expressed as $$f(x) = x^n + \sum_{i=1}^{i} x^{k_i} + 1$$

where n is odd, and the element A of the finite field is expressed as $A=(a_0,a_1,a_2,\ldots,a_{n-1})\in GF(2^n)$, and $C=(c_0,c_1,\ldots,c_{n-1})\in GF(2^n)$, the apparatus comprising:

a coefficient calculating unit, which calculates coefficients necessary for the squaring operation by:

determining predefined coefficients $V_0$, $V_{ij}$, and V, and indices $m_i$, $I_{ij}$, such that the index $m_i$ satisfies a predetermined condition with respect to $k_i$ when $0 \leq i \leq t$ is a natural number, the index $I_{ij}$ depends on n, $k_i$, and j when $2 \leq j \leq m_i$, the coefficients $V_0$ and $V_{ij}$ of n bits, respectively, depend on n, $i_{ij}$, and $k_i$, and obtaining the coefficient V with respect to $m_i$ according to the following formula, $$V_i = V_{i2} \oplus V_{i3} \oplus \ldots \oplus V_{im_i}$$

$$V = V_0 \oplus \sum_{m_i \neq 0} V_i;$$

determining a predefined coefficient $s_i$ according to $k_i$ and n and cyclically shifting the coefficient V by $s_i$;

an XOR operating unit, which includes a plurality of XOR gates and performs XOR operations on input A according to results of the calculated coefficient; and a rewiring unit, which rewires output terminals of the XOR operating unit in a predefined order and outputs final results of the squaring operation through the rewired output terminals as C.

8. The apparatus of claim 7, wherein, when the output of the XOR operating unit is expressed as $C'=c_0'c_1'\ldots c_{n-1}'$ and the square $A^2$ of the element A is expressed as $A^2=c_0c_1\ldots c_{n-1}$, the rewiring $c_j'$ with $c_i$ according to the following formula $c_i=c_j'(i\equiv 2j \bmod n)$.

9. A method to perform a squaring operation on an element A to output $A^2=C$ when a defining polynomial of a finite field $GF(2^n)$ is expressed as $$f(x) = x^n + \sum_{i=1}^{i} x^{k_i} + 1$$

where n is even, and the element A of the finite field is expressed as $A=(a_0,a_1,a_2,\ldots,a_{n-1})\in GF(2^n)$, and $C=(c_0,c_1,\ldots,c_{n-1})\in GF(2^n)$, the method comprising:

determining predefined coefficients $V_0$, $V_{ij}$, and V, and indices $m_i$, $I_{ij}$, such that the index $m_i$ satisfies a predetermined condition with respect to $k_i$ when $1 \leq i \leq t$ is a natural number, the index $I_{ij}$ depends on n, $k_i$, and j when $2 \leq j \leq m_i$, the coefficients $V_0$ and $V_{ij}$ of n bits, respectively, depend on n, $I_{ij}$, and $k_i$, and obtaining the coefficient V with respect to $m_i$ according to the following formula, $$V_i = V_{i2} \oplus V_{i3} \oplus \ldots \oplus V_{im_i}$$

$$V = V_0 \oplus \sum_{m_i \neq 1} V_i;$$

determining a predefined coefficient $s_i$ according to $k_i$ and n and cyclically shifting the coefficient V by $s_i$ according to a predetermined formula;

obtaining an element $\overline{A}$ from the element A and performing XOR operations on the cyclically shifted coefficient V with the element $\overline{A}$; and rewiring terminals connected to receive a result of the XOR operations in a predefined order and outputting results of the squaring operation through the terminals as C.

10. The method of claim 9, wherein the index $m_i$ is determined with respect to $k_i$ to satisfy the following formula $$\begin{cases} m_i = 1 & k_i = 1 \\ m_i = r & \frac{(r-2)n+1}{r-1} < k_i \leq \frac{(r-1)n+1}{r}, r \geq 2. \end{cases}$$

11. The method of claim 9, wherein the index $I_{ij}$ is determined by the following formula $$I_{ij} = \frac{n}{2} - (j-1)\frac{n}{2} + \left\lfloor (j-1)\frac{k_i}{2} \right\rfloor.$$

12. The method of claim 9, wherein the coefficient $V_0$ is determined by the follwing formula $$V_0 = \underbrace{a_{n-\frac{n}{2}} a_{n-\frac{n}{2}+1} \ldots a_{n-1} 00 \ldots 0}_{n \text{ bits}},$$

and the coefficient $V_{ij}$ is determined by the following formula $$V_{ij} = \underbrace{a_{n-l_{ij}} a_{n-l_{ij}+1} \ldots a_{n-1} 00 \ldots 0}_{n \text{ bits}}$$

when $k_i$ is even, or when both $k_i$ and j are odd, and the coefficient $V_{ij}$ is determined by the following formula $$V_{ij} = \underbrace{0 \ldots 0}_{\frac{n}{2} \text{ bits}} \underbrace{a_{n-l_{ij}} a_{n-l_{ij}+1} \ldots a_{n-1} 0 0 \ldots 0}_{\frac{n}{2} \text{ bits}}$$

when $k_i$ is odd and j is even.

13. The method of claim 9, wherein the coefficient $s_i$ is determined with respect to $k_i$ and n by the following formula $$s_i = \begin{cases} \frac{n+k_i-1}{2} & k_i\text{:odd} \\ \frac{k_i}{2} & k_i\text{:even.} \end{cases}$$

14. The method of claim 9, wherein the shift operation is carried out with respect to the element A according to the following formula $$a_0 \ldots a_{\frac{n}{2}-1} a_{\frac{n}{2}} \ldots a_{n-1} \overline{\gg} s = \begin{cases} a_{\frac{n}{2}-s} \ldots a_{\frac{n}{2}-1} a_0 \ldots a_{\frac{n}{2}-s-1} a_{n-s} \ldots a_{n-1} a_{\frac{n}{2}} \ldots a_{n-s-1} & s \leq \frac{n}{2}-1 \\ a_{n-s-1} \ldots a_{n-1} a_{\frac{n}{2}} \ldots a_{n-s+\frac{n}{2}-2} a_{\frac{n}{2}-s+\frac{n}{2}} \ldots a_{\frac{n}{2}-1} a_0 \ldots a_{\frac{n}{2}-s+\frac{n}{2}-1} & s \geq \frac{n}{2} \end{cases}$$

where the shift operation is represented by $\overline{\gg}$.

15. The method of claim 9, wherein the element $\overline{A}$ is determined by the following formula $$\overline{A} = \underbrace{(a_0 \oplus a_{\frac{n}{2}})(a_1 \oplus a_{\frac{n}{2}+1}) \ldots (a_{\frac{n}{2}-1} \oplus a_{n-1}) 0 \ldots 0.}_{n \text{ bit}}$$

16. The method of claim 9, wherein, when the result of the XOR operation is expressed as $C'=c_0'c_1' \ldots c_{n-1}'$ and the square $A^2$ of the element A is expressed as $A^2=c_0 c_1 \ldots c_{n-1}$, $c_i$ is obtained according to the following formula $$c_i = \begin{cases} c_j' & \left(i \equiv 2j, j \leq \frac{n}{2}-1\right) \\ c_j' & \left(i = 2j-n+1, j \geq \frac{n}{2}\right). \end{cases}$$

17. An apparatus performs a squaring operation on an element A to output $A^2=C$ when a defining polynomial of a finite field $GF(2^n)$ is expressed as $$f(x) = x^n + \sum_{i=1}^{i} x^{ki} + 1$$

where n is even, and the element A of the finite field is expressed as $A=(a_0,a_1,a_2, \ldots, a_{n-1}) \in GF(2^n)$, and $C=(c_0,c_1, \ldots, c_{n-1}) \in GF(2^n)$, the apparatus comprising:
a coefficient calculating unit, which calculates coefficients necessary for the squaring operation by:
determining predefined coefficients $V_0$, $V_{ij}$, and V, and indices $m_i$, $I_{ij}$, such that the index $m_i$ satisfies a predetermined condition with respect to $k_i$ when $1 \leq i \leq t$ is a natural number, the index $I_{ij}$ depends on n, $k_i$, and j when $2 \leq j \leq m_i$, the coefficients $V_0$ and $V_{ij}$ of n bits, respectively, depend on n, $I_{ij}$, and $k_i$, and obtaining the coefficient V with respect to $m_i$ according to the following formula, $$V_i = V_{i2} \oplus V_{i3} \oplus \ldots \oplus V_{im_i},$$

$$V = V_0 \oplus \sum_{m_i \neq 0} V_i;$$

determining a predefined coefficient $s_i$ according to $k_i$ and n and cyclically shifting the coefficient V by $s_i$ according to a predetermined formula;
an XOR operating unit, which includes a plurality of XOR gates, and which obtains an element $\overline{A}$ from the input element A according to a second predetermined formula, and performs XOR operations on results of the cyclic shift operation received from the coefficient calculating unit with the element $\overline{A}$; and
a rewiring unit, which rewires output terminals C' of the XOR operating unit and outputs final results of the squaring operation through the rewired output terminals as C.

18. The apparatus of claim 17, wherein the second predetermined formula is defined as $$\overline{A} = \underbrace{(a_0 \oplus a_{\frac{n}{2}})(a_1 \oplus a_{\frac{n}{2}+1}) \ldots (a_{\frac{n}{2}-1} \oplus a_{n-1}) 0 \ldots 0.}_{n \text{ bits}}$$

19. The apparatus of claim 17, wherein when the output C' of the XOR operating unit is expressed as $C'=c_0'c_1' \ldots c_{n-1}'$ and the square $A^2$, of the element A, is expressed as $A^2=c_0 c_1 \ldots c_{n-1}$, the rewiring $c_j'$ with $c_i$ according to the following formula $$c_i = \begin{cases} c_j' & \left(i \equiv 2j, j \leq \frac{n}{2}-1\right) \\ c_j' & \left(i = 2j-n+1, j \geq \frac{n}{2}\right). \end{cases}$$

20. A method to perform a squaring operation on an element A to output $A^2=C$ when a defining polynomial of a finite field $GF(2^n)$ is expressed as $$f(x) = x^n + \sum_{i=1}^{i} x^{ki} + 1,$$

and the element A of the finite field is expressed as $A=(a_0,a_1,a_2, \ldots, a_{n-1}) \in GF(2^n)$, and $C=(c_0,c_1, \ldots, c_{n-1}) \in GF(2^n)$, the method comprising:

determining predefined coefficients $V_0$, $V_{ij}$, and V, and indices $m_i$, $I_{ij}$, such that when m is odd, the index $m_i$ satisfies a second predetermined condition with respect to $k_i$ when $0 \leq i \leq t$ is a natural number, and when m is even, the index $m_i$ satisfies a second predetermined condition with respect to $k_i$ when $1 \leq i \leq t$ is a natural number, the index $I_{ij}$ depends on n, $k_i$, and j when $2 \leq j \leq m_i$, the coefficients $V_0$ and $V_{ij}$ of n bits, respectively, depend on n, $I_{ij}$, and $k_i$;

when n is odd, obtaining the coefficient V with respect to $m_i$ according to the following formula, $$V_i = V_{i2} \oplus V_{i3} \oplus \ldots \oplus V_{im},$$
$$V = V_0 \oplus \sum_{m_i \neq 0} V_i;$$

when n is even, obtaining the coefficient V with respect to $m_i$ according to the following formula $$V_i = V_{i2} \oplus V_{i3} \oplus \ldots \oplus V_{im},$$
$$V = V_0 \oplus \sum_{m_i \neq 1} V_i;$$

determining a predetermined coefficient $s_i$ according to $k_i$ and n and cyclically shifting the coefficient V by $s_i$;

when n is odd, performing XOR operations on the cyclically shifted coefficient V and the element A;

when n is even obtaining an element $\overline{A}$ from the element A and performing XOR operations on the cyclically shifted coefficient V with the element $\overline{A}$; and rewiring terminals to receive a result of the XOR operations in a predetermined order and outputting results of the squaring operation through the terminals as C.

21. The method according to claim 20, wherein the index $m_i$ is determined with respect to $k_i$ to satisfy the following formula $$\frac{(r-2)n+1}{r-1} < k_i \leq \frac{(r-1)n+1}{r}, r \geq 2$$

when $m_i = r$
when n is odd and $m_i = 0$ $k_i = 1$
when n is even and $m_i = 1$ $k_i = 1$.

22. The method according to claim 20, wherein the index $I_{ij}$ is determined by the following formulas
when n is odd $$l_{ij} = \frac{n-1}{2} - \left\lfloor (j-1)\frac{n-k_i}{2} \right\rfloor$$

when n is even $$l_{ij} = \frac{n}{2} - (j-1)\frac{n}{2} + \left\lfloor (j-1)\frac{k_i}{2} \right\rfloor.$$

23. The method according to claim 20, wherein:
when n is odd
the coefficient $V_0$ is determined by the following formula $$V_0 = \underbrace{a_{\frac{n+1}{2}} a_{\frac{n+3}{2}} \ldots a_{n-1} 00 \ldots 0}_{n \text{ bits}},$$

when one of $k_i$ is odd, and $k_i$ is even and j is odd, the coefficient $V_{ij}$ is determined by the following formula $$V_{ij} = \underbrace{a_{n-l_{ij}} a_{n-l_{ij}+1} \ldots a_{n-1} 00 \ldots 0}_{n \text{ bits}},$$

and when both $k_i$ and j are even, the coefficient $V_{ij}$ is determined by the following formula $$V_{ij} = \underbrace{0 \ldots 0}_{\frac{(n-1)}{2} \text{bits}} \underbrace{a_{n-l_{ij}} a_{n-l_{ij}+1} \ldots a_{n-1} 00 \ldots 0}_{\frac{(n+1)}{2} \text{bits}};$$

and when n is even
the coefficient $V_0$ is determined by the following formula $$V_0 = \underbrace{a_{n-\frac{n}{2}} a_{n-\frac{n}{2}+1} \ldots a_{n-1} 00 \ldots 0}_{n \text{ bits}},$$

when $k_i$ is even, or when both $k_i$ and j are odd, the coefficient $V_{ij}$ is determined by the following formula $$V_{ij} = \underbrace{a_{n-l_{ij}} a_{n-l_{ij}+1} \ldots a_{n-1} 00 \ldots 0}_{n \text{ bits}},$$

and when $k_i$ is odd and j is even, the coefficient $V_{ij}$ is determined by the following formula $$V_{ij} = \underbrace{0 \ldots 0}_{\frac{n}{2} \text{bits}} \underbrace{a_{n-l_{ij}} a_{n-l_{ij}+1} \ldots a_{n-1} 00 \ldots 0}_{\frac{n}{2} \text{bits}}.$$

24. The method according to claim 20, wherein:
when n is odd, the coefficient $s_i$ is determined with respect to $k_i$ and n by the following formula $$s_i = \begin{cases} \frac{k_i+1}{2} & k_i \text{:odd} \\ \frac{k_i+1+n}{2} & k_i \text{:even;} \end{cases}$$

and
when n is even, the coefficient $s_i$ is determined with respect to $k_i$ and n by the following formula $$s_i = \begin{cases} \dfrac{n+k_i-1}{2} & k_i:\text{odd} \\ \dfrac{k_i}{2} & k_i:\text{even}. \end{cases}$$

25. The method according to claim 20, wherein when n is even, the shift operation is carried out with respect to the element A according to the following formula $$a_0 \ldots a_{\frac{n}{2}-1} a_{\frac{n}{2}} \ldots a_{n-1} \gg s = \begin{cases} a_{\frac{n}{2}-s} \ldots a_{\frac{n}{2}-1} a_0 \ldots a_{\frac{n}{2}-s-1} a_{n-s} \ldots a_{n-1} a_{\frac{n}{2}} \ldots a_{n-s-1} & s \leq \dfrac{n}{2}-1 \\ a_{n-s-1} \ldots a_{n-1} a_{\frac{n}{2}} \ldots a_{n-s+\frac{n}{2}-2} a_{\frac{n}{2}-s+\frac{n}{2}} \ldots a_{\frac{n}{2}-1} a_0 \ldots a_{\frac{n}{2}-s+\frac{n}{2}-1} & s \geq \dfrac{n}{2} \end{cases}$$

where the shift operation is represented by $\gg$.

26. The method according to claim 20, wherein the element $\overline{A}$ is determined by the following formula $$\overline{A} = \underbrace{(a_0 \oplus a_{\frac{n}{2}})(a_1 \oplus a_{\frac{n}{2}+1}) \ldots (a_{\frac{n}{2}-1} \oplus a_{n-1}) 0 \ldots 0}_{n\ bit}.$$

27. The method according to claim 20, wherein when the result C' of the XOR operations is expressed as $C'=c_0'c_1' \ldots c_{n-1}'$ and the square $A^2$ of the element A is expressed as $A^2=c_0 c_1 \ldots c_{n-1}$, $c_i$ is obtained according to the following formulas:

when n is odd, $c_i = c_j'(i \equiv 2j \bmod n)$; and
when n is even, $$c_i = \begin{cases} c_j' & \left(i \equiv 2j,\ j \leq \dfrac{n}{2}-1\right) \\ c_j' & \left(i = 2j-n+1,\ j \geq \dfrac{n}{2}\right). \end{cases}$$

28. An apparatus to perform a squaring operation on an element A to output $A^2=C$ when a defining polynomial of a finite field $GF(2^n)$ is expressed as $$f(x) = x^n + \sum_{i=1}^{t} x^{k_i} + 1$$

where n is even, and the element A of the finite field is expressed as $A=(a_0, a_1, a_2, \ldots, a_{n-1}) \in GF(2^n)$, and $C=(c_0, c_1, \ldots, c_{n-1}) \in GF(2^n)$, the apparatus comprising:

a coefficient calculating unit, which calculates coefficients necessary for the squaring operation by:
  determining predetermined coefficients $V_0$, $V_{ij}$, and V, and indices $m_i$, $I_{ij}$, such that when m is odd, the index $m_i$ satisfies a second predetermined condition with respect to $k_i$ when $0 \leq i \leq t$ is a natural number, and when m is even, the index $m_i$ satisfies a second predetermined condition with respect to $k_i$ when $1 \leq i \leq t$ is a natural number, the index $I_{ij}$ depends on n, $k_i$, and j when $2 \leq j \leq m_i$, the coefficients $V_0$ and $V_{ij}$ of n bits, respectively, depend on n, $I_{ij}$, and $k_i$;
when n is odd, obtaining the coefficient V with respect to $m_i$ according to the following formula, $$V_i = V_{i2} \oplus V_{i3} \oplus \ldots \oplus V_{im_i}$$

$$V = V_0 \oplus \sum_{m_i \neq 0} V_i;$$

when n is even, obtaining the coefficient V with respect to $m_i$ according to the following formula $$V_i = V_{i2} \oplus V_{i3} \oplus \ldots \oplus V_{im_i}$$

$$V = V_0 \oplus \sum_{m_i \neq 1} V_i;$$

determining a predetermined coefficient $s_i$ according to $k_i$ and n and cyclically shifting the coefficient V by $s_i$;
an XOR operating unit, which includes a plurality of XOR gates, and that
  when n is odd, performs XOR operations on input A according to results of the coefficient calculating, and
  when n is even, obtains an element $\overline{A}$ from the input element A according to a predetermined formula, and performs XOR operations on results of the cyclic shift operation received from the coefficient calculating unit with the element $\overline{A}$; and
a rewiring unit, which
  when n is odd, rewires outputs of the XOR operating unit in a predetermined order and outputs final results of the squaring operation, and
  when n is even, rewires output terminals C' of the XOR operating unit and outputs final results of the squaring operation through the rewired output terminals as C.

29. The apparatus according to claim 28, wherein, when the output C' of the XOR operating unit is expressed as $C'=c_0'c_1' \ldots c_{n-1}'$ and the square $A^2$ of the element A is expressed as $A^2=c_0 c_1 \ldots c_{n-1}$, the rewiring unit rewires $c_j'$ with $c_i$ according to the following formula when n is odd, $c_i = c_j'(i \equiv 2j \bmod n)$, and
when n is even, $$c_i = \begin{cases} c_j' & \left(i \equiv 2j,\ j \leq \dfrac{n}{2}-1\right) \\ c_j' & \left(i = 2j-n+1,\ j \geq \dfrac{n}{2}\right). \end{cases}$$

* * * * *

UNITED STATES PATENT AND TRADEMARK OFFICE
CERTIFICATE OF CORRECTION

PATENT NO.       : 7,543,012 B2
APPLICATION NO.  : 10/868186
DATED            : June 2, 2009
INVENTOR(S)      : Weon-il Jin et al.

It is certified that error appears in the above-identified patent and that said Letters Patent is hereby corrected as shown below:

Title Page, item [57] Column 2 (Abstract), Line 6, change "$I_{ij}$," to --$l_{ij}$,--.

Title Page, item [57] Column 2 (Abstract), Line 8, change "$I_{ij}$" to --$l_{ij}$--.

Title Page, item [57] Column 2 (Abstract), Line 9, change "$I_{ij}$," to --$l_{ij}$,--.

Title Page, item [57] Column 2 (Abstract), Line 12, change "$V_{imi}$" to --$V_{im}$,--.

Column 13, Line 61, change "$I_{ij}$," to --$l_{ij}$,--.

Column 13, Line 63, change "$I_{ij}$" to --$l_{ij}$--.

Column 13, Line 65, change "$I_{ij}$," to --$l_{ij}$,--.

Column 14, Line 4 (equation), change "$V_{imi}$" to --$V_{im}$,--.

Column 14, Line 25, change "$I_{ij}$" to --$l_{ij}$--.

Column 15, Line 3, change "square" to --square,--.

Column 15, Line 3, change "A" to --A,--.

Column 15, Line 3, change "$c_{n-1}, c_i$" to --$c_{n-1}, c_i$--.

Column 15, Line 15 (equation), change " $f(x) = x^n + \sum_{i=1}^{i} x^{ki} + 1$ " to -- $f(x) = x^n + \sum_{i=1}^{t} x^{ki} + 1$ --.

UNITED STATES PATENT AND TRADEMARK OFFICE
CERTIFICATE OF CORRECTION

PATENT NO.        : 7,543,012 B2
APPLICATION NO. : 10/868186
DATED             : June 2, 2009
INVENTOR(S)       : Weon-il Jin et al.

It is certified that error appears in the above-identified patent and that said Letters Patent is hereby corrected as shown below:

Column 15, Line 22, change "$V_i$," to --$V_{ij}$,--.

Column 15, Line 23, change "$I_{ij}$," to --$l_{ij}$,--.

Column 15, Line 25, change "$I_{ij}$" to --$l_{ij}$--.

Column 15, Line 26, change "$V_{ij}$of" to --$V_{ij}$ of--.

Column 15, Line 27, change "$i_{ij}$," to --$l_{ij}$,--.

Column 15, Line 35 (equation), "$V_{imi}$" to --$V_{im}$,--.

Column 15, Line 57, change "$c_{n-1}$' and" to --$c_{n-1}$', and--.

Column 15, Line 58, change "square" to --square,--.

Column 15, Line 58, change "A" to --A,--.

Column 15, Line 59, change "rewiring" to --rewiring unit rewires--.

Column 15, Line 65 (equation), change " $f(x) = x^n + \sum_{i=1}^{t} x^{ki} + 1$ " to -- $f(x) = x^n + \sum_{i=1}^{t} x^{ki} + 1$ --.

Column 16, Line 6, change "$I_{ij}$," to --$l_{ij}$,--.

Column 16, Line 8, change "$I_{ij}$" to --$l_{ij}$--.

Column 16, Line 10, change "$I_{ij}$," to --$l_{ij}$,--.

UNITED STATES PATENT AND TRADEMARK OFFICE
CERTIFICATE OF CORRECTION

PATENT NO. : 7,543,012 B2
APPLICATION NO. : 10/868186
DATED : June 2, 2009
INVENTOR(S) : Weon-il Jin et al.

It is certified that error appears in the above-identified patent and that said Letters Patent is hereby corrected as shown below:

Column 16, Line 15 (equation), change "$V_{imi}$" to --$V_{im}$,--.

Column 16, Line 39, change "$I_{ij}$" to --$l_{ij}$--.

Column 16, Line 47, change "follwing" to --following--.

Column 17, Line 40, change "square" to --square,--.

Column 17, Line 40, change "A" to --A,--.

Column 17, Line 40, change "$c_{n-1}, c_i$" to --$c_{n-1}$, $c_i$--.

Column 17, Line 55 (equation), change " $f(x) = x^n + \sum_{i=1}^{l} x^{l_i} + 1$ " to -- $f(x) = x^n + \sum_{i=1}^{l} x^{l_i} + 1$ --.

Column 17, Line 65, change "$I_{ij}$," to --$l_{ij}$,--.

Column 17, Line 67, change "$I_{ij}$" to --$l_{ij}$--.

Column 18, Line 2, change "$I_{ij}$," to --$l_{ij}$,--.

Column 18, Line 15, change "a" to --a first--.

Column 18, Line 45, change "square" to --square,--.

Column 18, Line 45, change "$A^2$," to --$A^2$--.

UNITED STATES PATENT AND TRADEMARK OFFICE
CERTIFICATE OF CORRECTION

| | | |
|---|---|---|
| PATENT NO. | : 7,543,012 B2 | Page 4 of 5 |
| APPLICATION NO. | : 10/868186 | |
| DATED | : June 2, 2009 | |
| INVENTOR(S) | : Weon-il Jin et al. | |

It is certified that error appears in the above-identified patent and that said Letters Patent is hereby corrected as shown below:

Column 18, Line 46, change "rewiring" to --rewiring unit rewires--.

Column 18, Line 60 (equation), change $f(x) = x^n + \sum_{i=1}^{l} x^{ki} + 1$ " " to -- $f(x) = x^n + \sum_{i=1}^{l} x^{ki} + 1$ --.

Column 19, Line 2, change "$I_{ij}$," to --$l_{ij}$,--.

Column 19, Line 7, change "$I_{ij}$" to --$l_{ij}$--.

Column 19, Line 9, change "$I_{ij}$," to --$l_{ij}$,--.

Column 19, Lines 45-49, change

" $\frac{(r-2)n+1}{r-1} < k_i \leq \frac{(r-1)n+1}{r}, r \geq 2$ " to

--when $m_i = r$ $\frac{(r-2)n+1}{r-1} < k_i \leq \frac{(r-1)n+1}{r}, r \geq 2$ --.

Column 19, Line 51, "$I_{ij}$" to --$l_{ij}$--.

Column 21, Line 34, change "square" to --square,--.

Column 21, Line 34, change "A" to --A,--.

Column 21, Line 35, change "$c_{n-1},c_i$" to --$c_{n-1}, c_i$--.

Column 21, Line 62, change "$I_{ij}$," to --$l_{ij}$,--.

UNITED STATES PATENT AND TRADEMARK OFFICE
CERTIFICATE OF CORRECTION

PATENT NO. : 7,543,012 B2
APPLICATION NO. : 10/868186
DATED : June 2, 2009
INVENTOR(S) : Weon-il Jin et al.

It is certified that error appears in the above-identified patent and that said Letters Patent is hereby corrected as shown below:

Column 21, Line 67, change "$I_{ij}$" to --$l_{ij}$--.

Column 22, Line 2, change "$I_{ij}$," to --$l_{ij}$,--.

Column 22, Line 9 (equation), change "$V_{imi}$" to --$V_{im}$,--.

Column 22, Line 26 (equation), change "$V_{imi}$" to --$V_{im}$,--.

Column 22, Line 54, change "$c_{n-1}$' and" to --$c_{n-1}$', and--.

Column 22, Line 54, change "square" to --square,--.

Column 22, Line 54, change "A" to --A,--.

Column 22, Line 56, change "formula" to --formulas--.

Signed and Sealed this

Eighth Day of December, 2009

David J. Kappos
*Director of the United States Patent and Trademark Office*